(12) United States Patent
Badreddine

(10) Patent No.: US 7,488,413 B2
(45) Date of Patent: Feb. 10, 2009

(54) WASTE WATER TREATMENT PLANT AND METHOD

(75) Inventor: Hassan Hans Badreddine, Beirut (LB)

(73) Assignee: Bioshaft Water Technology, Inc, Carlsbad, CA (US)

( * ) Notice: Subject to any disclaimer, the term of this patent is extended or adjusted under 35 U.S.C. 154(b) by 0 days.

(21) Appl. No.: 10/585,244

(22) PCT Filed: Jan. 6, 2004

(86) PCT No.: PCT/GB2004/000002

§ 371 (c)(1),
(2), (4) Date: Sep. 5, 2006

(87) PCT Pub. No.: WO2005/066081

PCT Pub. Date: Jul. 21, 2005

(65) Prior Publication Data

US 2007/0163954 A1  Jul. 19, 2007

(51) Int. Cl.
*C02F 3/06* (2006.01)

(52) U.S. Cl. .................. 210/151; 210/194; 210/197; 210/617; 210/629; 261/DIG. 72

(58) Field of Classification Search .......... 210/150, 210/151, 194, 197, 220, 616, 617, 629; 261/DIG. 72
See application file for complete search history.

(56) References Cited

U.S. PATENT DOCUMENTS

| | | | | |
|---|---|---|---|---|
| 3,043,433 A | * | 7/1962 | Singer | 210/197 |
| 3,543,937 A | * | 12/1970 | Choun | 210/150 |
| 3,758,087 A | * | 9/1973 | Hoon, Jr. | 261/DIG. 72 |
| 4,113,810 A | * | 9/1978 | Ikawa | 261/DIG. 72 |
| 4,139,456 A | | 2/1979 | Yabuuchi et al. | |
| 4,203,935 A | * | 5/1980 | Hackenjos | 261/DIG. 72 |
| 4,391,703 A | * | 7/1983 | Crosby | 210/151 |
| 4,581,299 A | * | 4/1986 | Jager | 261/DIG. 72 |
| 4,810,377 A | * | 3/1989 | Kato et al. | 210/150 |
| 4,933,076 A | * | 6/1990 | Oshima et al. | 210/151 |
| 5,156,742 A | * | 10/1992 | Struewing | 210/151 |
| 5,202,027 A | * | 4/1993 | Stuth | 210/151 |
| 5,217,616 A | * | 6/1993 | Sanyal et al. | 210/150 |
| 5,518,618 A | | 5/1996 | Mulder et al. | |
| 6,024,876 A | * | 2/2000 | Pannier et al. | 210/150 |
| 6,036,863 A | | 3/2000 | Brockdorff | |

FOREIGN PATENT DOCUMENTS

| | | |
|---|---|---|
| DE | 35 16 617 A | 11/1986 |
| DE | 39 16 520 A | 11/1990 |

(Continued)

*Primary Examiner*—Christopher Upton
(74) *Attorney, Agent, or Firm*—Young & Thompson

(57) ABSTRACT

A waste water treatment plant includes a treatment chamber or reactor (26) containing a plurality of buoyant sludge carriers (38). In the base of the treatment chamber (26) is a biofilm collection chamber (40). Arranged coaxially within the chamber (26) is a hollow shaft (30) with an air injection device (32) arranged at the foot thereof. In use waste water is introduced into the treatment chamber through an inlet (28) and is caused to circulate around the treatment chamber through the pumping action of the shaft (30) and air injector. Treated water passes through the biofilm collection chamber (40) to an outer settlement chamber (42) having an outlet (44) for treated water.

20 Claims, 3 Drawing Sheets

FOREIGN PATENT DOCUMENTS

| | | |
|---|---|---|
| DE | 196 33 629 A | 2/1998 |
| GB | 360 272 A | 11/1931 |
| GB | 2 253 622 | 9/1992 |
| JP | 03 101896 A | 4/1991 |
| JP | 5-316898 | 12/1993 |
| JP | 7-124583 | 5/1995 |

* cited by examiner

WASTE WATER TREATMENT PLANT AND METHOD

CROSS REFERENCE TO RELATED APPLICATION

This application is the 35 USC 371 national stage of international application PCT/GB2004/000002 filed on Jan. 6, 2004, which designated the United States of America.

FIELD OF THE INVENTION

This invention relates to a waste water treatment plant and method. Biological treatment of human (domestic) waste water using an aerobic activated sludge process is a very effective and low cost method of purification. Conventional extended aeration systems however require large aeration and sedimentation volumes. These volumes can be reduced significantly by using an activated sludge using conjunction with sludge carriers.

BACKGROUND OF THE INVENTION

All conventional treatment systems require an effluent collecting station of which solid particles are sediment, and the entire waste water is passed through a 25 mm screen to remove coarse, solid material. A comminutor may be applied to shed coarse materials before screening the effluent. The collection station may typically be equipped with an overflow to prevent flooding. From the effluent collection station, the waste water may be transferred to a balancing tank or directly to secondary treatment.

There is a need for a low maintenance treatment plant which provides a high degree of purification at a low energy cost and a low capital cost. Furthermore the design should be compact making it relatively easy to install with minimum disturbance to the landscape. Ideally the plant should operate without any treatment of sludge required, or produce a relatively low amount of sludge.

SUMMARY OF THE INVENTION

Accordingly in one aspect, this invention provides a waste water treatment plant including:

a treatment chamber containing a plurality of sludge carrier elements, and, in a lower part thereof a bio-film collection region for receiving in use bio-film from said sludge carrier elements;

an outlet for delivering waste water into an upper part of said treatment chamber;

a settlement chamber in flow communication at its lower end with said treatment chamber, whereby in use water may flow from said treatment chamber via said bio-film collection region to said settlement chamber;

a generally vertical column disposed in said treatment chamber and having an upper end which projects above the liquid surface in use, and a lower region in flow communication with said treatment chamber, and air delivery means for introducing air or other gas into a lower region of said column in use to aerate the liquid therein and to cause the liquid to flow upwardly to overflow into said treatment chamber.

In this way, the liquid emerging from the top of the vertical column disgorges back into the top of the treatment chamber thereby tending to provide a re-circulating effect which causes the sludge carrier elements to re-circulate up and down the height of the treatment chamber.

Preferably the air introducing means comprises a nozzle designed to create a large number of microbubbles which saturate the liquid with air and simultaneously force the sewage in the water to the surface.

Preferably, a screen element is provided at the upper end of said treatment chamber to keep the sludge carrier elements within said treatment chamber. Likewise there is preferably a screen element to separate the main part of the treatment chamber from the bio-film collection region to prevent the sludge carrier elements entering the bio-film collection region.

Preferably the sludge carrier elements are made of a material having a specific gravity less than one so that they are generally buoyant in the water. The sludge carrier elements may be made of any suitable material although plastics material is preferred. The sludge carrier elements are preferably of generally uniform size. In a particularly preferred embodiment, the sludge carrier elements are generally spherical with a central bore passing from one side to the other. In this way, one or more anaerobic decomposition processes may take place within the bore of the sludge carrier element whilst, on the exposed outer surface, one or more aerobic decomposition processes dominate. This can provide a very high level of sewage purification at great speed. Preferably, the inner and/or outer surfaces of the sludge carrier elements are textured or patterned to provide an extended surface area; in one example the inner and/or outer surface may be corrugated to provide ribs or wings.

The settlement tank preferably has an outlet for purified water towards its upper end.

Preferably, the treatment chamber is generally cylindrical, and said vertical column is located co-axially within the treatment chamber. The settlement chamber is preferably of annular form encircling the treatment chamber.

Particularly where high degrees of purification and suspended solid removal is required, aeration means may be provided in the lower part of the settlement chamber, with the settlement chamber being in flow communication at its lower end with a further settlement chamber. Where the concentric cylindrical/annular arrangement described above is employed the further settlement chamber may be of annular form generally surrounding the first-mentioned settlement chamber.

BRIEF DESCRIPTION OF THE DRAWING

The invention may be performed in various ways, and embodiments of water treatment plant will now be described by way of example only, reference being made to the accompanying drawings in which.

DESCRIPTION OF THE PREFERRED EMBODIMENTS

Figure 1:
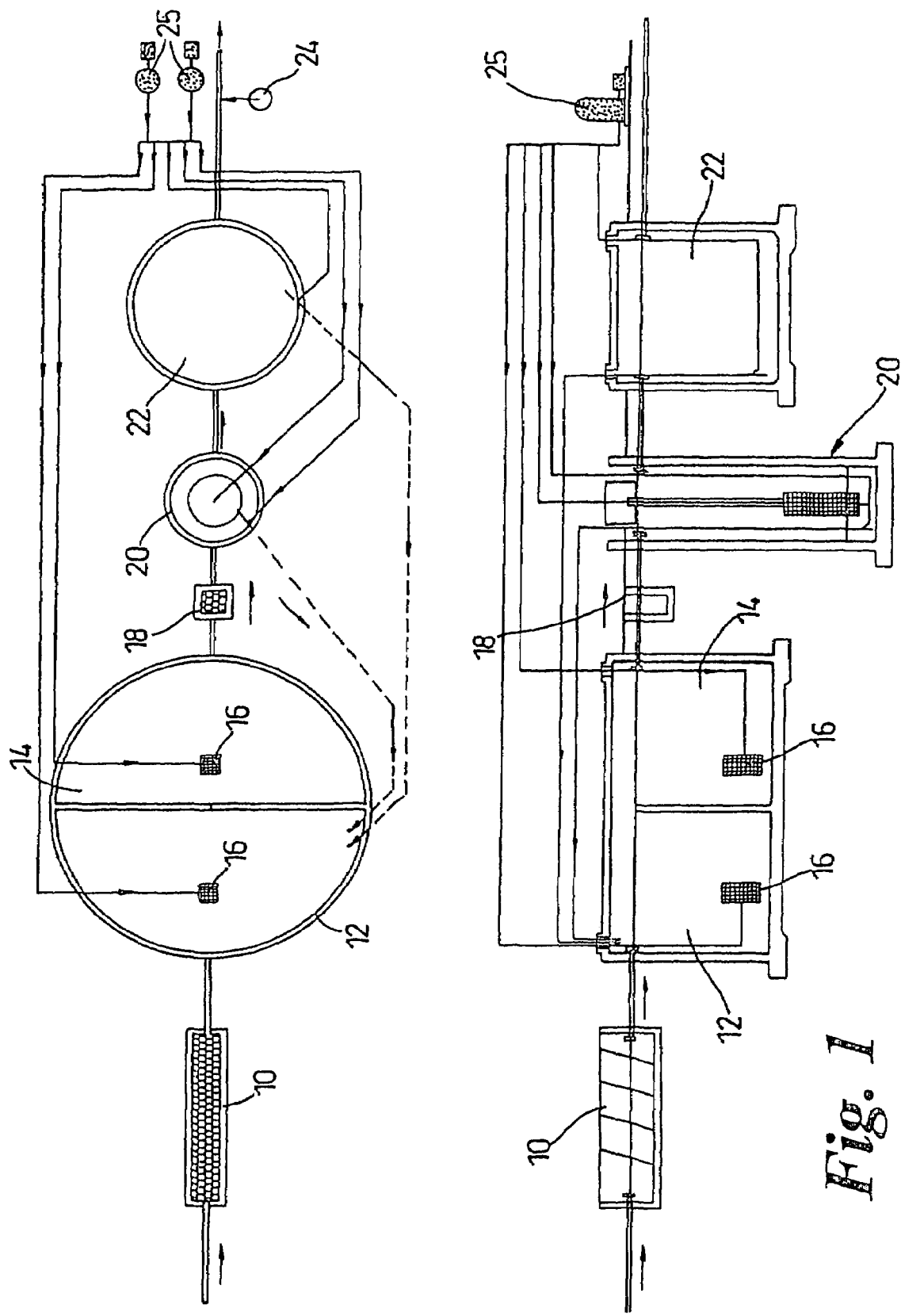
FIG. 1 is a schematic view of a water treatment plant in accordance with this invention in plan and cross-section.

Referring initially to FIG. 1, this shows plan and section views through a typical installation in accordance with this invention. An overview of the installation will be given first followed by a detailed description of the reactor vessel. Waste water passes to a first screen filter 10 and from there into a balance tank 12 having an overflow tank 14. In the base of each of the balance tank 12 and the overflow tank 14 may be provided air diffusers 16. From the overflow tank 14 the waste water passes through a second screen filter 18 and then to the reactor 20 (to be described in full detail below) where it is subjected to aerobic and anaerobic decomposition processes. The purified water passes from the reactor 20 to a clarifier tank 22. In the clarifier tank there is provided an air lift pump for recycling sludge back the balance tank 12. After the clarifier the purified water is delivered for onward use, with an optional disinfection stage illustrated at 24. Air for the sludge re-cycling from the clarifier tank 22 and from the reactor 20 as well as for the reaction process is provided by two air compressors 25.

Figure 2:
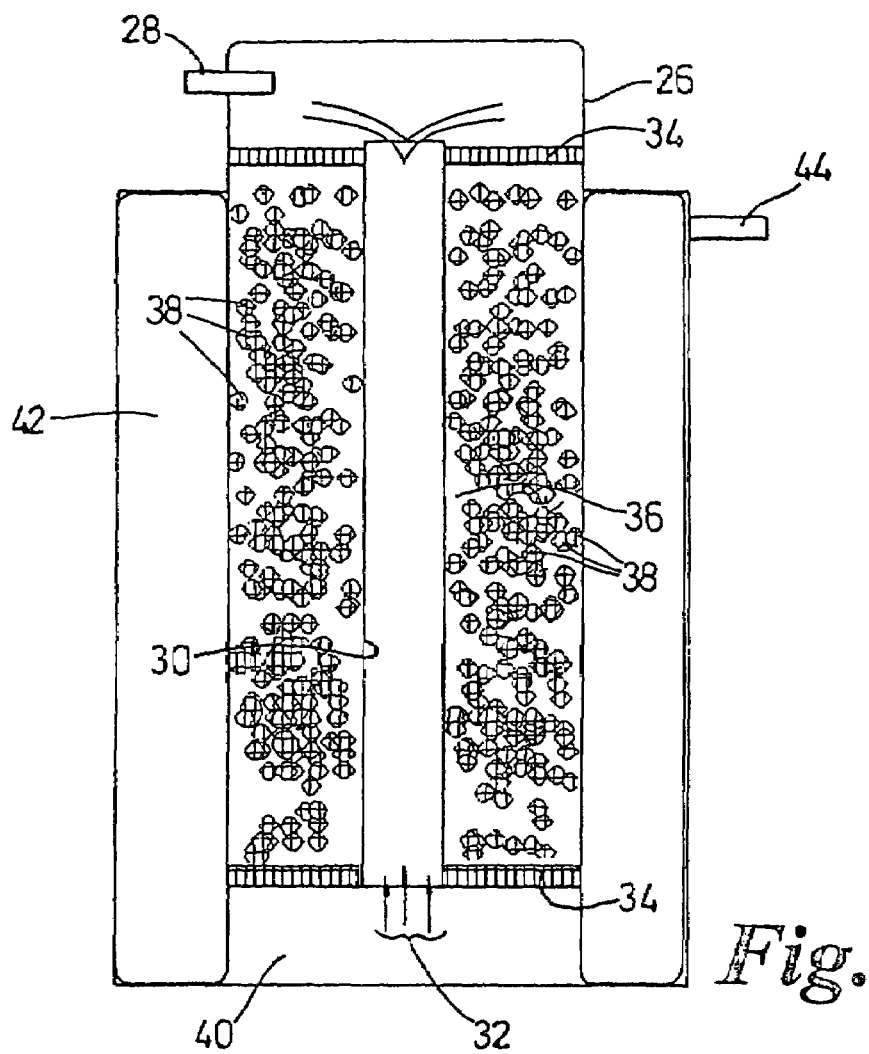
FIG. 2 is a view is a view of a first embodiment of reaction apparatus in accordance with this invention.
Figure 4:
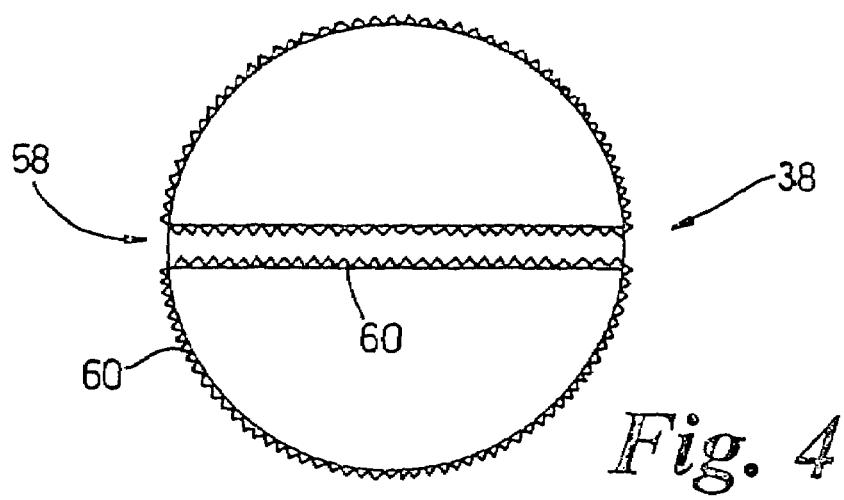
FIG. 4 is a schematic cross-section on an enlarged scare through a sludge carrier element of this invention.

Referring now to FIG. 2, the first embodiment of reactor comprises a treatment chamber 26 of generally cylindrical form and having an inlet 28 for influent at its upper end. Arranged coaxially within the treatment chamber 26 is a hollow column or shaft 30 at the lower end of which is an air injection device 32. Extending radially from the upper and lower ends of the column 30 are two spaced parallel disc screens 34 which define a reaction volume 36 in which are confined a number of sludge carriers 38. The sludge carriers 38 are formed of a plastics material and are generally spherical but with a corrugated outer surface and central bore extending therethrough as shown in FIG. 4. Beneath the lower screen 34 is defined a biofilm collection chamber 40 which communicates radially with a settlement chamber 42 arranged concentrically around the treatment chamber 26.

In use, waste water is introduced into the treatment chamber 26 through the inlet 28 and then passes through the upper screen 34 into the reaction volume 36. The sludge carriers 38 carry on their outer surface organisms which aerobically decompose sewage in the waste water and, on the inner surface, microorganisms which anaerobically decompose the sewage. The sludge carriers have a specific gravity of less than one and so are buoyant in the liquid and therefore tend to rise to the top. This action is counteracted by the flow of influent downwardly when it leaves the inlet 28. In addition, the air injection device 32 provides a large number of microbubbles which saturate sewage in the central column 30 with air and also cause it to rise rapidly up the column to disgorge back into the reaction chamber. The combined effect of this is that the sludge carrier elements 38 are kept moving up and down the reaction chamber thus enhancing exposure of the microorganisms to with the material contained therein. In addition, there is constant collision between the sludge carrier elements and this helps to remove excess microbial bio-mass by means of the downcurrent. This self-cleaning feature protects the biological filter against possible clogging and makes the unit virtually maintenance free. Thus the bio-film collects in the biofilm collection region 40 and purified water migrates outwardly into the settlement chamber 42 from which it may be pumped out from outlet 44.

If required, the sludge from the sludge collection region 40 may be removed by means of an air lift system of generally conventional form (not shown). Purified water rises through the settlement chamber to the outlet 44.

Figure 3:
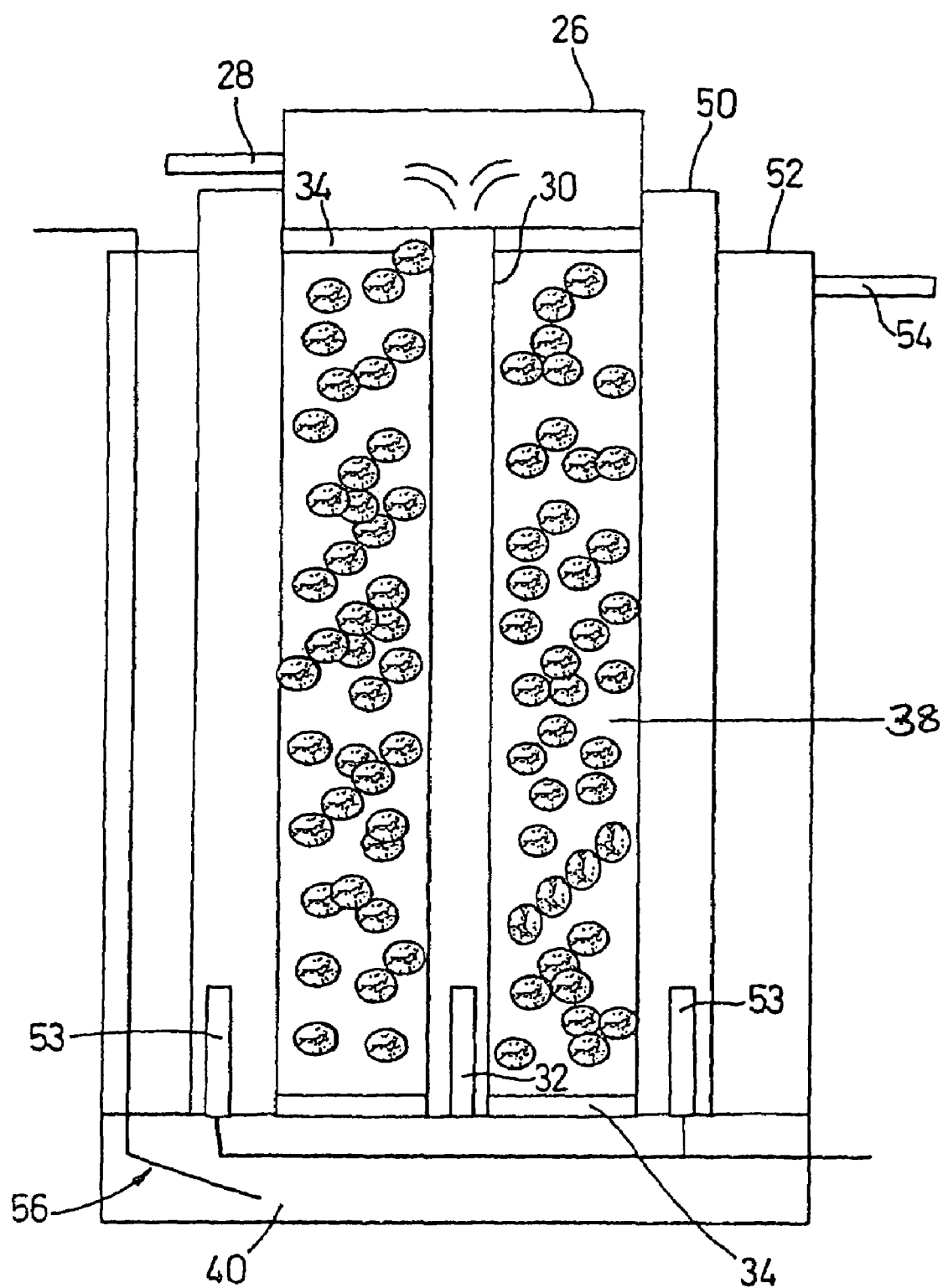
FIG. 3 is a view of a second embodiment of reactor apparatus in accordance with this invention.

Referring now to the second embodiment shown in FIG. 3 this includes a treatment tank 24 as before with a central riser column 30 and an air injector 32 with screens 34 defining a reaction volume containing sludge carrier elements 38. In this embodiment however, there are two settlement/aeration tanks 50, 52 arranged concentrically with each other and with the treatment tank 26. The intermediate aeration/settlement tank 50 is adjacent to the treatment tank 26 and is provided with a series of air injector nozzles 53 which inject air and thus oxygen content into the water in the aeration/settlement tank 50 and reduce the amount of sludge. Arranged concentrically outside the intermediate chamber 50 is a settlement chamber 52 similar to the settlement chamber 42 of the first embodiment and having an outlet 54 for effluent at its upper end. As previously, the treatment chamber 26 communicates with the aeration/settlement chamber 50 and the outer settlement chamber 52 through the sludge collection region 40. An air lifting system indicated generally at 56 is provided for removal of the sludge collecting in the sludge collection region 40.

Referring now to FIG. 4, there is shown a schematic diagram of a sludge carrier element 38 for use in the embodiments of FIGS. 2 and 3. The sludge carrier is of general spherical form, about 25 mm in diameter and having a single bore 58 of about 3 mm passing thereto. It will be appreciated that these dimensions may be varied as required. The sludge carrier element is made of plastics material having a density of less than one so that it is buoyant. The external and internal surfaces carry "wings" or "ribs" 60 to extend the surface area thereof.

The reactors described above have several important advantages. Using the design principles of the present invention it is possible to increase the size of the reactor to treat higher capacities. The special air injection system increases the oxygen dissolving in the water thereby improving the purification process. The central shaft allows aeration of the water to increase its oxygen content and also circulates the waste water to increase the bio-mass on the sludge carriers. The high surface area/sludge carrier elements make the design flexible so that a reactor of larger capacity can be designed by increasing the number of the sludge carriers. In this way the aeration tank can be increased to larger sizes without increasing the surface area, for example by increasing the volume of the existing chamber or by adding another chamber operating in parallel. Furthermore compared to conventional treatments the sludge production may be at very low levels because the sludge concentration is very high relative to the conventional treatments and the sludge can be of good quality.

The invention claimed is:

1. A waste water treatment plant including:

a treatment chamber containing a plurality of generally buoyant sludge carrier elements, and, in a lower part thereof a bio-film collection region for receiving in use bio-film from said sludge carrier elements;

an upper screen element at the upper end of said treatment chamber and a lower screen element separating the main part of the treatment chamber from the biofilm collection region, thereby to define, between said upper and lower screen elements, a containment volume within which said sludge carrier elements are confined;

an outlet for delivering waste water into an upper part of said treatment chamber;

a settlement chamber in flow communication at its lower end with said treatment chamber, whereby in use water may flow from said treatment chamber via said bio-film collection region to said settlement chamber;

a generally vertical column passing through said treatment chamber and having an upper end which projects above the liquid surface in use, and a lower region in flow communication with said treatment chamber below said lower screen element, and air delivery means for introducing air or other gas into a lower region of said column in use to aerate the liquid therein and to cause the liquid to flow upwardly to overflow into said treatment chamber, thereby to circulate back down the treatment chamber, whereby in use the flow from said column causes movement of said sludge carrier elements up and down said containment volume, with and against the flow of said liquid.

2. The waste water treatment plant according to claim 1 wherein the air delivery means comprises a nozzle designed to create a large number of microbubbles which saturate the liquid with air and simultaneously force the sewage in the water to the surface.

3. The waste water treatment plant according to claim 1, wherein the sludge carrier elements are made of plastics material.

4. The waste water treatment plant according to claim 1, wherein the sludge carrier elements are of generally uniform size.

5. The waste water treatment plant according to claim 4, wherein the sludge carrier elements are generally spherical with a central bore passing from one side to the other.

6. The waste water treatment plant according to claim 5, wherein the inner and/or outer surfaces of the sludge carrier elements are textured or patterned to provide an extended surface area.

7. The waste water treatment plant according to claim 6, wherein the inner and/or outer surfaces are corrugated to provide ribs or wings.

8. The waste water treatment plant according to claim 1, wherein the settlement tank has an outlet for purified water towards its upper end.

9. The waste water treatment plant according to claim 1, wherein the treatment chamber is generally cylindrical, and said vertical column is located coaxially within the treatment chamber.

10. The waste water treatment plant according to claim 9, wherein the settlement chamber is of annular form encircling the treatment chamber.

11. The waste water treatment plant according to claim 10, further comprising aeration means in the lover part of the settlement chamber, with the settlement chamber being in flow communication at its lower end with a further settlement chamber.

12. The waste water treatment plant according to claim 11, wherein the further settlement chamber is of annular form generally surrounding the first-mentioned settlement chamber.

13. A waste water treatment plant including:
a treatment charter containing a plurality of sludge carrier elements and, in a lower part thereof, a bio-film collection region for receiving in use bio-film from said sludge carrier elements;
an outlet for delivering waste water into an upper part of said treatment chamber;
a settlement chamber in flow communication at its lower end with said treatment chamber, whereby in use water may flow from said treatment chamber via said bio-film collection region to said settlement chamber;
a generally vertical column passing through said treatment chamber and having an upper end which projects above the liquid surface in use, and a lower end in flow communication with said treatment chamber;
air delivery means for introducing air or other gas into a lower region of said column in use to aerate the liquid therein and to cause the fluid to flow upwardly to flow into said treatment chamber, and
a further settlement chamber being in flow communication with the lower end of said first-mentioned settlement chamber.

14. The waste water treatment plant according to claim 13, wherein the further settlement chamber is of annular form generally surrounding the first-mentioned settlement chamber.

15. A waste water treatment plant including:
a generally cylindrical treatment chamber containing a plurality of sludge carrier elements and, in a lower part thereof, a bio-film collection region for receiving in use bio-film from said sludge carrier elements;
an outlet for delivering waste water into an upper part of said treatment chamber;
a first settlement chamber of annular form and generally surrounding the treatment chamber, and in flow communication at its lower end with said treatment chamber, whereby in use water may flow from said treatment chamber via said bio-film collection region to said first settlement chamber;
a generally vertical column disposed co-axially within said treatment chamber and having an upper end which projects above the liquid surface in use, and a lower end in flow communication with said treatment chamber;
air delivery means for introducing air or other gas into a lower region of said column in use to aerate the liquid therein and to cause the fluid to flow upwardly to flow into said treatment chamber;
aeration means provided in the lower part of the first settlement chamber; and
a further settlement chamber being in flow communication with the lower end of said first settlement chamber.

16. The waste water treatment plant according to claim 15, wherein the further settlement chamber is of annular form generally surrounding the first settlement chamber.

17. The waste water treatment plant according to claim 15, further comprising an upper screen element at the upper end of said treatment chamber and a lower screen element separating the main part of the treatment chamber from the bio-film collection region, thereby to define, between said upper and lower screen elements, a containment volume within which said sludge carrier elements are confined.

18. The waste water treatment plant according to claim 15, wherein the sludge carrier elements are generally buoyant and spherical with a central bore passing from one side to the other.

19. The waste water treatment plant according to claim 18, wherein the inner and/or outer surfaces of the sludge carrier elements are textured or patterned to provide an extended surface area.

20. The waste water treatment plant according to claim 19, wherein the inner and/or outer surfaces are corrugated to provide ribs or wings.

* * * * *